United States Patent [19]
Leichner

[11] Patent Number: 6,002,748
[45] Date of Patent: Dec. 14, 1999

[54] DISASTER ALERT BY TELEPHONE SYSTEM

[76] Inventor: James L. Leichner, 6656 Oak Bend Commons Way, Canal Winchester, Ohio 43110

[21] Appl. No.: 09/238,132

[22] Filed: Jan. 27, 1999

[51] Int. Cl.⁶ .................................................. H04M 11/04
[52] U.S. Cl. ............................... 379/48; 379/49; 340/601
[58] Field of Search .......................... 379/37–51, 110.01, 379/90.01; 340/601

[56] References Cited

U.S. PATENT DOCUMENTS

| | | |
|---|---|---|
| 3,603,951 | 9/1971 | O'Bracken . |
| 3,643,029 | 2/1972 | Breazeale . |
| 3,665,462 | 5/1972 | Seaton et al. . |
| 4,155,042 | 5/1979 | Permut et al. . |
| 5,218,708 | 6/1993 | Kanbayashi et al. . |
| 5,794,207 | 8/1998 | Walker et al. . |
| 5,917,887 | 6/1999 | Fesler et al. ............................... 379/48 |
| 5,949,851 | 9/1999 | Mahaffey .................................. 379/48 |

*Primary Examiner*—Wing F. Chan
*Attorney, Agent, or Firm*—Frank H. Foster; Kremblas, Foster, Millard & Pollick

[57] ABSTRACT

Local telephone exchanges in a threatened geographical area connect to their subscribers and transmit a recorded warning message. This is done in response to transmission of threat data communicated from one of several remote computer terminals to a central computer. The central computer has a data storage device upon which is stored a local exchange database and preferably recorded warning messages. Upon receipt of the threat data from the remote computer terminal, the central computer is connected in communication with the local exchanges in the threatened geographical area and instructs the local exchanges to connect to its subscribers and provides instructions or a warning message to be played to the subscribers who go off-hook.

20 Claims, 10 Drawing Sheets

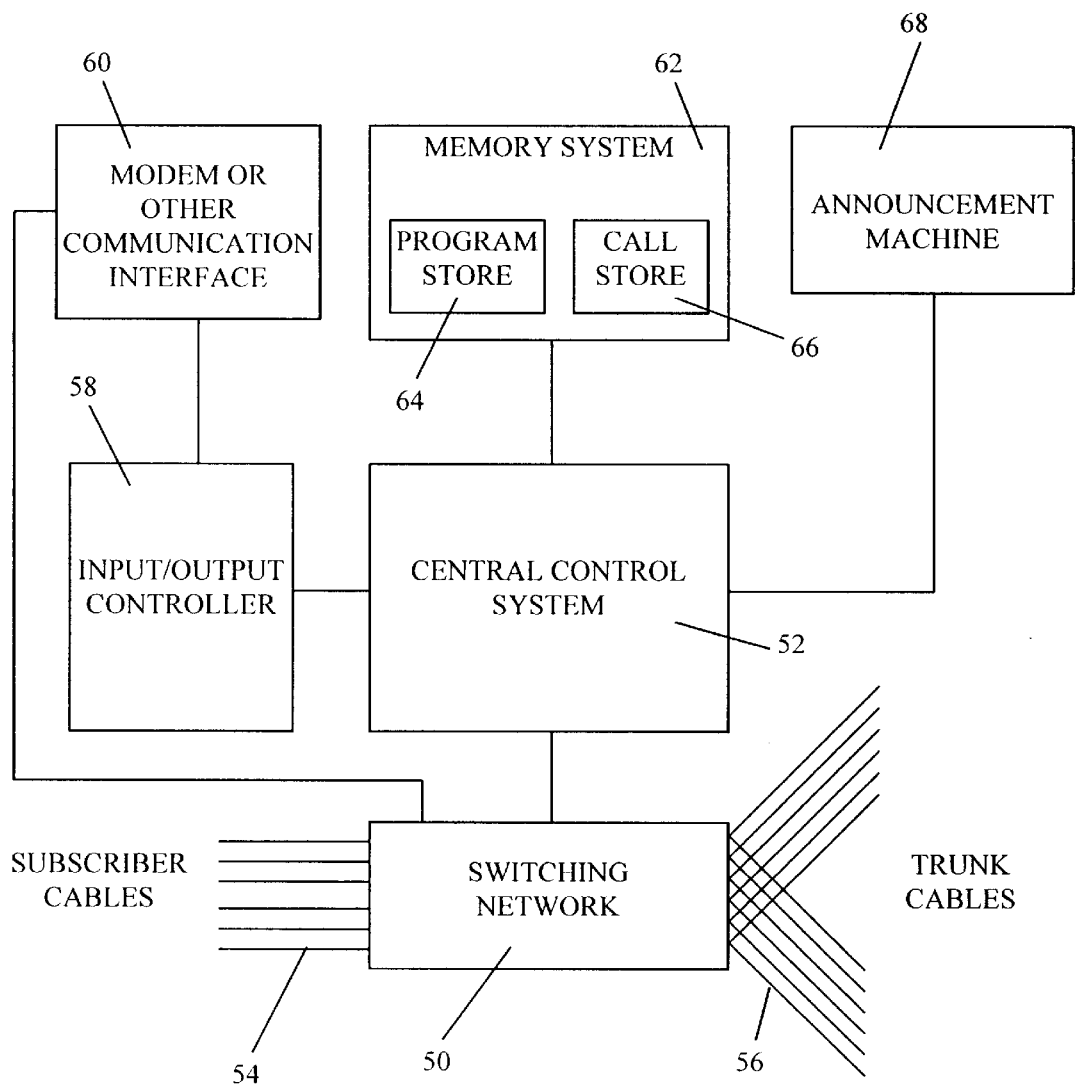
FIG. 2 LOCAL EXCHANGE SWITCHING SYSTEM

FIG. 3 EXISTING THREAT DATA COMMUNICATED FROM RCT

| INSTANCE | THREAT TYPE | THREAT LOCATION | THREAT HEADING |
|---|---|---|---|
| 1 | HURRICANE | MIAMI, FLORIDA | 270° |
| 2 | BOMB THREAT | PHILADELPHIA | |
| 3 | CHEMICAL SPILL | FRANKLIN COUNTY OHIO | |
| 4 | TORNADO | OHIO, FAIRFIELD, PLEASANT | 90° |
| OTHERS | | | |

FIG. 4 LOCAL EXCHANGE DATABASE STORED AT THE CENTRAL COMPUTER

| INSTANCE | GEOGRAPHICAL LOCATION | COMMUNICATION ADDRESS | ID/AUTHORIZATION |
|---|---|---|---|
| 1 | Ohio, Fairfield, NW | 292.395.213.1 | A19F35B990C10 |
| 2 | Virginia, Fairfax, NE | 703/751-2233 | |
| 3 | | | |
| OTHERS | | | |

FIG. 5 MESSAGE DATABASE STORED AT THE CENTRAL COMPUTER

| INSTANCE | THREAT TYPE | STORED MESSAGE |
|---|---|---|
| 1 | HURRICANE | THERE IS A HURRICANE APPROACHING... |
| 2 | CHEMICAL SPILL | A POTENTIALLY HARMFUL DISCHARGE... |
| OTHERS | | |

FIG. 6
THREAT RESPONSE SUBSCRIBER DATABASE STORED AT THE CENTRAL COMPUTER

| INSTANCE | THREAT TYPE | GEOGRAPHICAL LOCATION | TELEPHONE NUMBER |
|---|---|---|---|
| 1 | CHEMICAL SPILL | 82° 33' LONG. - 39° 35' LAT. | 740/654-6711 |
| OTHERS | | | |

DISASTER ALERT BY TELEPHONE SYSTEM

CROSS-REFERENCES TO RELATED APPLICATIONS (Not Applicable)

STATEMENT REGARDING FEDERALLY-SPONSORED RESEARCH AND DEVELOPMENT (Not Applicable)

BACKGROUND OF THE INVENTION

1. Field of the Invention

This invention relates generally to computers and telephone communication systems and more particularly relates to a system for warning telephone subscribers of a threatened disaster in or approaching their geographical area.

2. Description of the Related Art

From time to time people in various geographical locations are subjected to threatened property damage and injury from a variety of natural and man-made potential disasters. Typical threatened disasters include natural disasters from weather, such as tornadoes, hurricanes, mud slides, floods and wind shear, as well as man-made disasters, such as those resulting from fire, radiation leakage, toxic chemical leakage or bomb threats. Ordinarily, the earlier people and communities are alerted to such threats so that they can make preparations for protecting themselves from them, the less the property damage or personal injury resulting from these threatened disasters.

There are already in place and operational a variety of prior art systems for warning or alerting people to disaster threats. These most prominently include the public media, such as radio and television news and weather broadcasts and the weather radio system operated by the National Weather Service. These systems, however, are subject to deficiencies because they require radio transmissions broadcast from transmitters located in the region of the disaster, and require that individuals have their radio or television equipment turned on, operating and being observed by the individuals. Persons who are not operating such equipment do not receive an alert, unless they are fortunate enough to have someone nearby who has received the alert and who is aware of their presence and goes to the effort to give them a personal warning.

Additionally, there are siren warning systems to alert members of the public who are in danger of a threatened disaster. These systems are also subject to deficiencies because some areas are not equipped with such siren warning systems and the sirens can be difficult or impossible to hear when there is ambient noise, such as from construction or traffic or a heavy storm or when the sirens are simply too far off to be heard.

There are also a variety of additional warning systems, mostly radio operated, which require specialized equipment. Very few people purchase such equipment and therefore these systems are not effective in providing sufficient warning to large numbers of people.

The infrastructure of the United States and many other countries currently includes a national telephone system, which provides a communication system which is more widely distributed and provides the most personal route to connection to the greatest number of people. Existing telephone systems are nearly always in a stand-by or enabled status, ready to receive telephone calls without the need for purchasing any special equipment or being turned on to be enabled. Furthermore, the telephone systems of most homes and businesses have ringing or comparable signaling equipment capable of signaling an incoming call even to people who are remote from the telephone, but able to hear its signal.

However, despite the availability of this infrastructure, the telephone system is currently essentially unused for the purpose of communicating disaster alert information to large numbers of people.

It is therefore an object and purpose of the present invention to provide a system which is capable of utilizing the telephone equipment to alert massive numbers of people, such as most of the telephone subscribers in a threatened geographical area, to the existence or approach of a threatened disaster.

BRIEF SUMMARY OF THE INVENTION

The invention is directed to a system utilizing modern computer equipment for inputting the nature and geographical area of threatened disasters on a national scale from anywhere in the country where threatened disasters are detected and monitored, then communicating the nature of the threat to the telephone switches used by the local exchanges in the vicinity of the threatened disaster and instructing the local exchanges to connect to its telephone subscribers and transmit to each subscriber who answers the phone a selected warning message which is appropriate for the particular type of threatened disaster.

The invention contemplates the location of at least one and preferably a plurality of remote computer terminals at each of a variety of threatened disaster detection locations. Disaster detection locations are at those organizations, often governmental agencies, which have responsibility to monitor particular threatening conditions or to serve as a central communication or control center for particular threatening conditions. Such disaster detection locations would, for example, include the National Weather Service and the National Hurricane Center, chemical and nuclear power plants, and various other governmental and private agencies which are charged with detecting and/or dealing with specialized types of disasters.

These remote computer terminals are programmed and connected by conventional communication links, such as long distance telephone lines, the internet, or satellite links, to a central computer to transmit information to the central computer specifying at least the nature of the disaster and its geographical area. The central computer has stored on a data storage device a data structure having instances of local telephone exchanges representing all the exchanges in the country. Each local exchange instance has associated attributes of the exchange's geographical service area and data for communicating with the exchange.

This arrangement permits data to be input at the remote computer terminal specifying a type of threatened disaster and its geographical location. This data is communicated to the central computer. The central computer then communicates by any of several conventional communication channels to the local telephone exchanges in the geographical area which is threatened with the disaster. The central computer and the local exchanges are programmed to permit the central computer to instruct the local exchanges to connect to their telephone subscribers and transmit a recorded voice message to those subscribers who answer their phone. The recorded message is either previously recorded and stored at the local exchange or communicated to the local exchange from the central computer. This voice message may, for example, inform the subscriber of the nature of the disaster and protective action to be taken.

BRIEF DESCRIPTION OF THE SEVERAL VIEWS OF THE DRAWINGS

FIG. 2 is a block diagram illustrating the electronic switching system used by local telephone exchange.

FIGS. 3–6 illustrate the database structure for four classes or types of data and showing the attributes for objects of each class.

Figure 1:
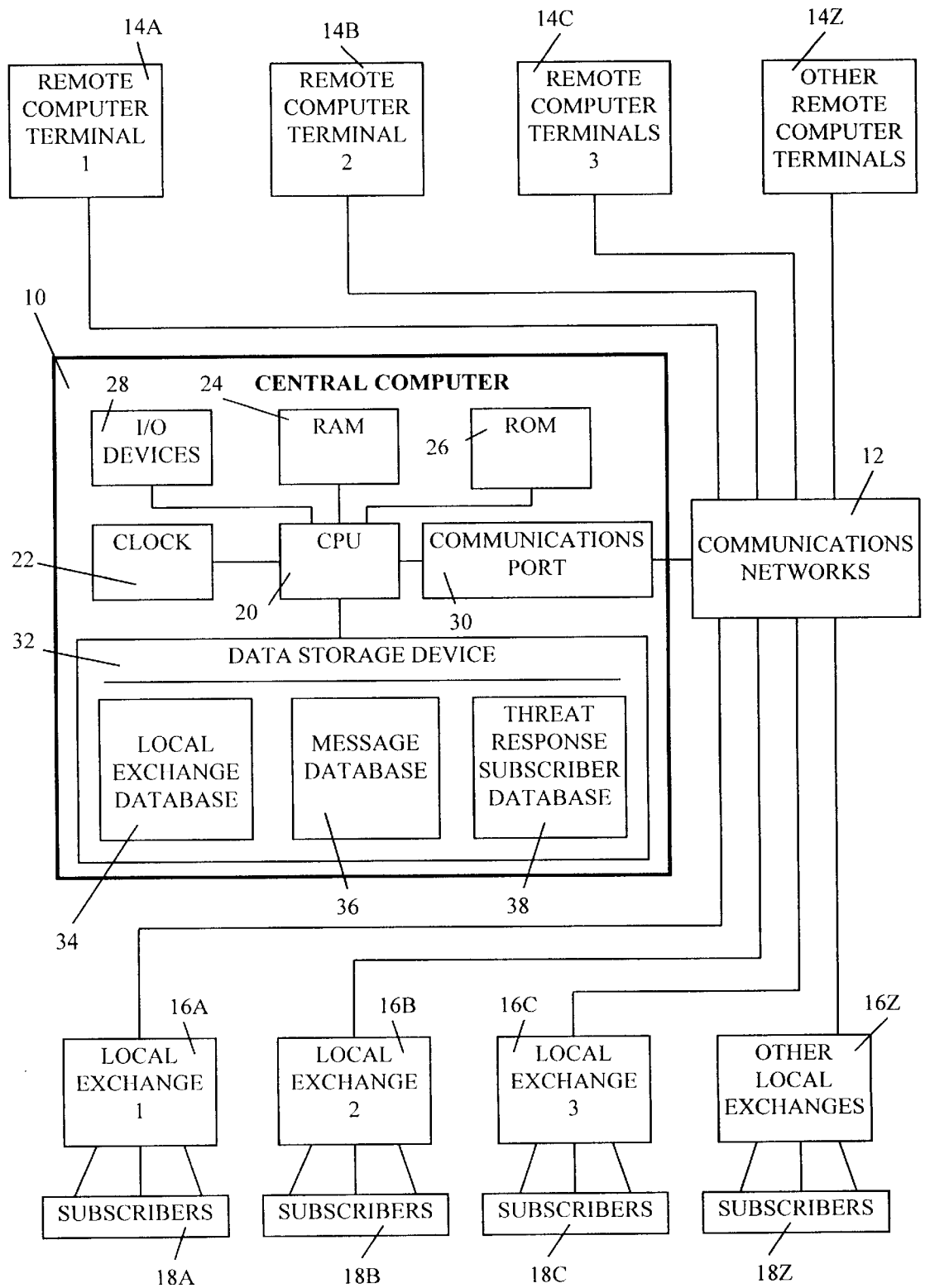
FIG. 1 is a block diagram illustrating the principal components of the invention.
Figure 7:
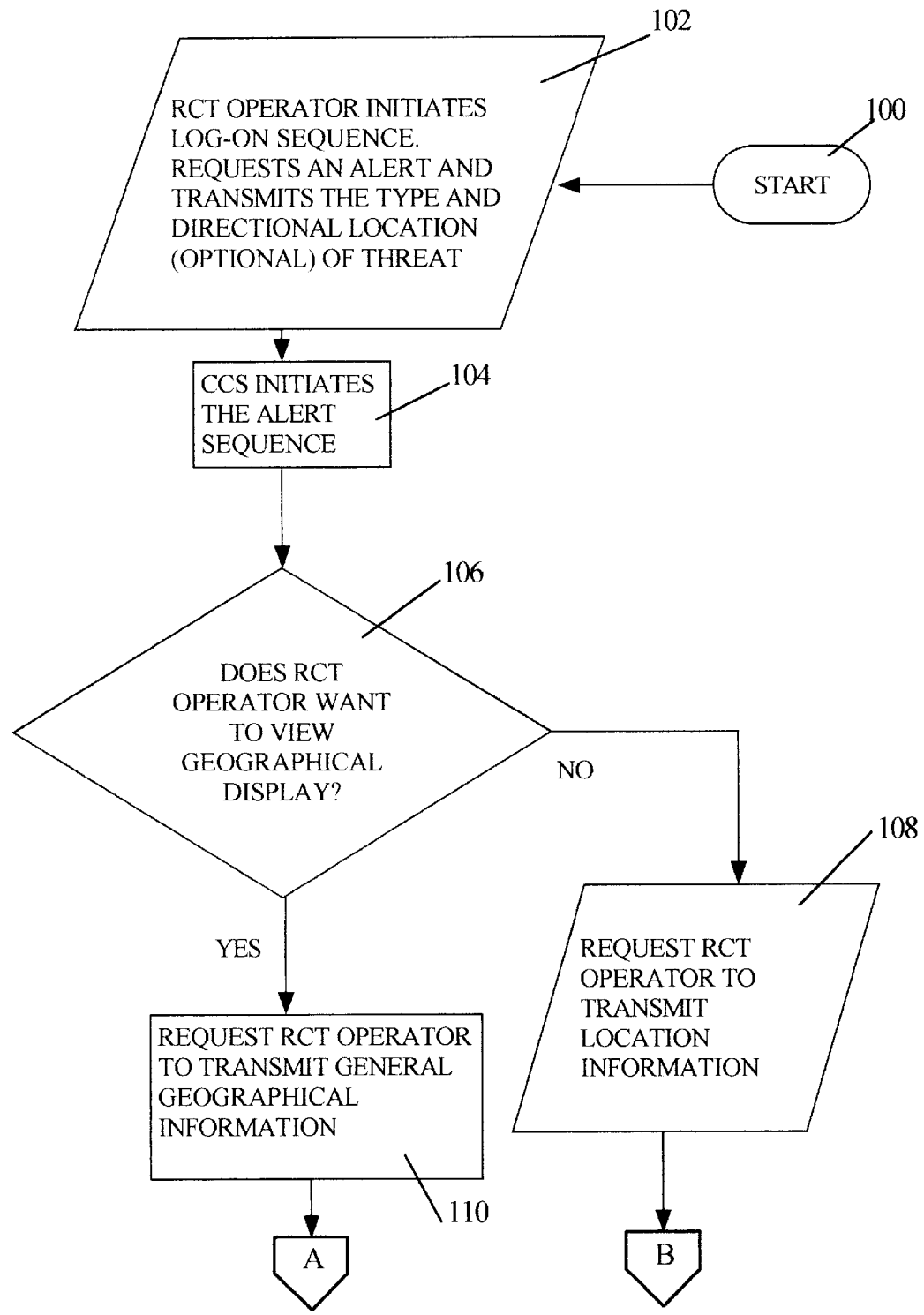
FIGS. 7 through 13 are a flow chart illustrating the operation of the preferred embodiment of the invention.
Figure 8:
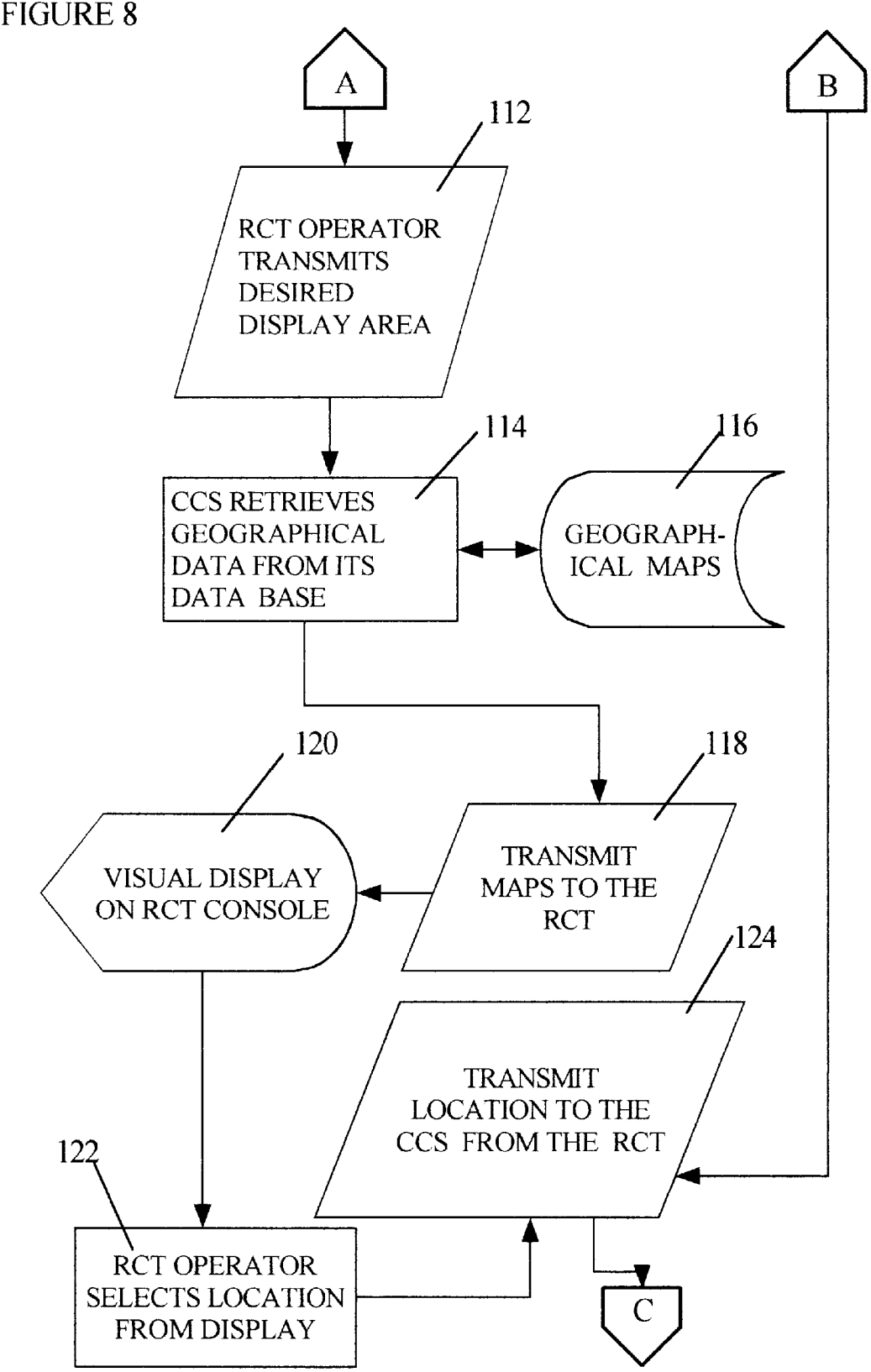
Figure 9:
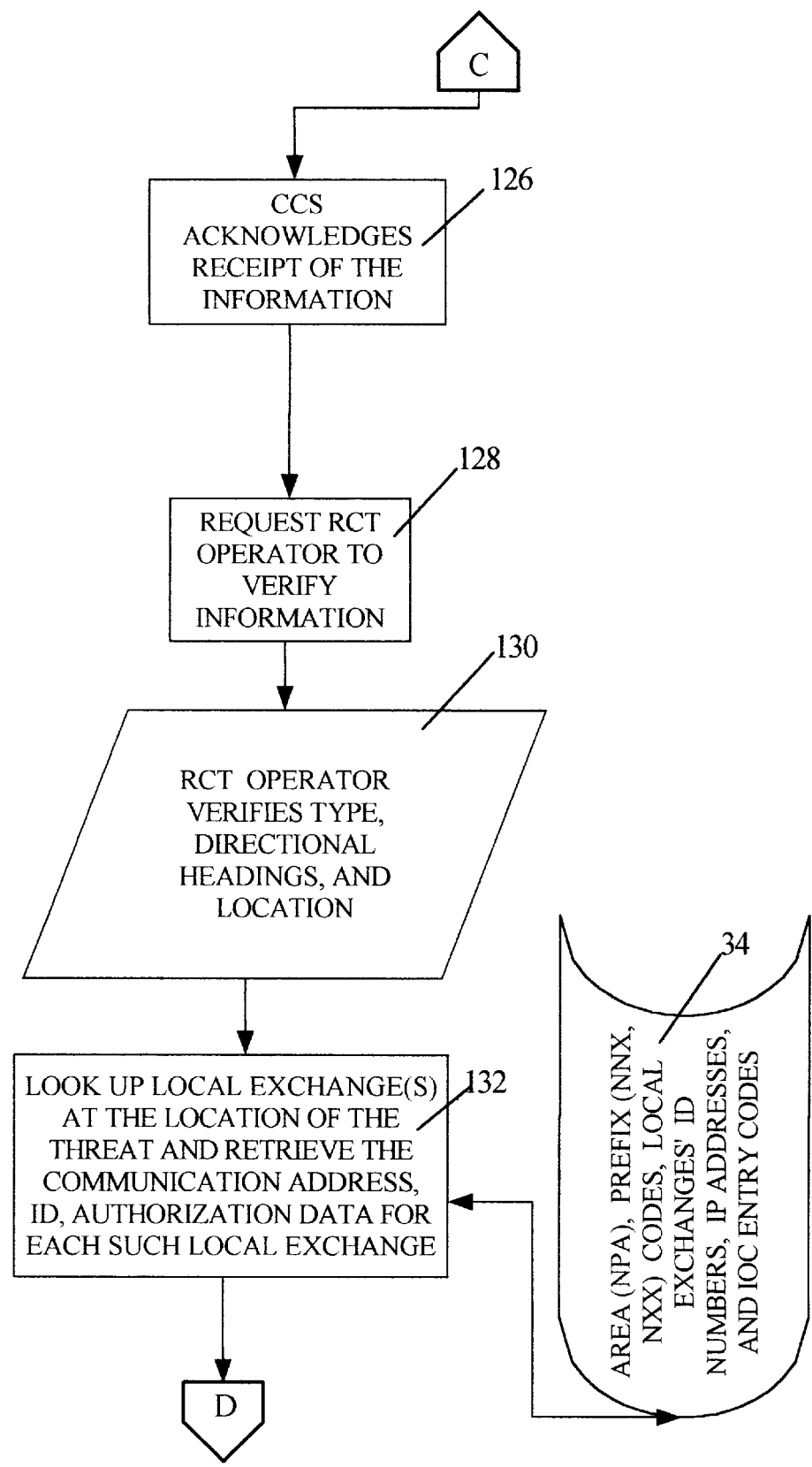
Figure 10:
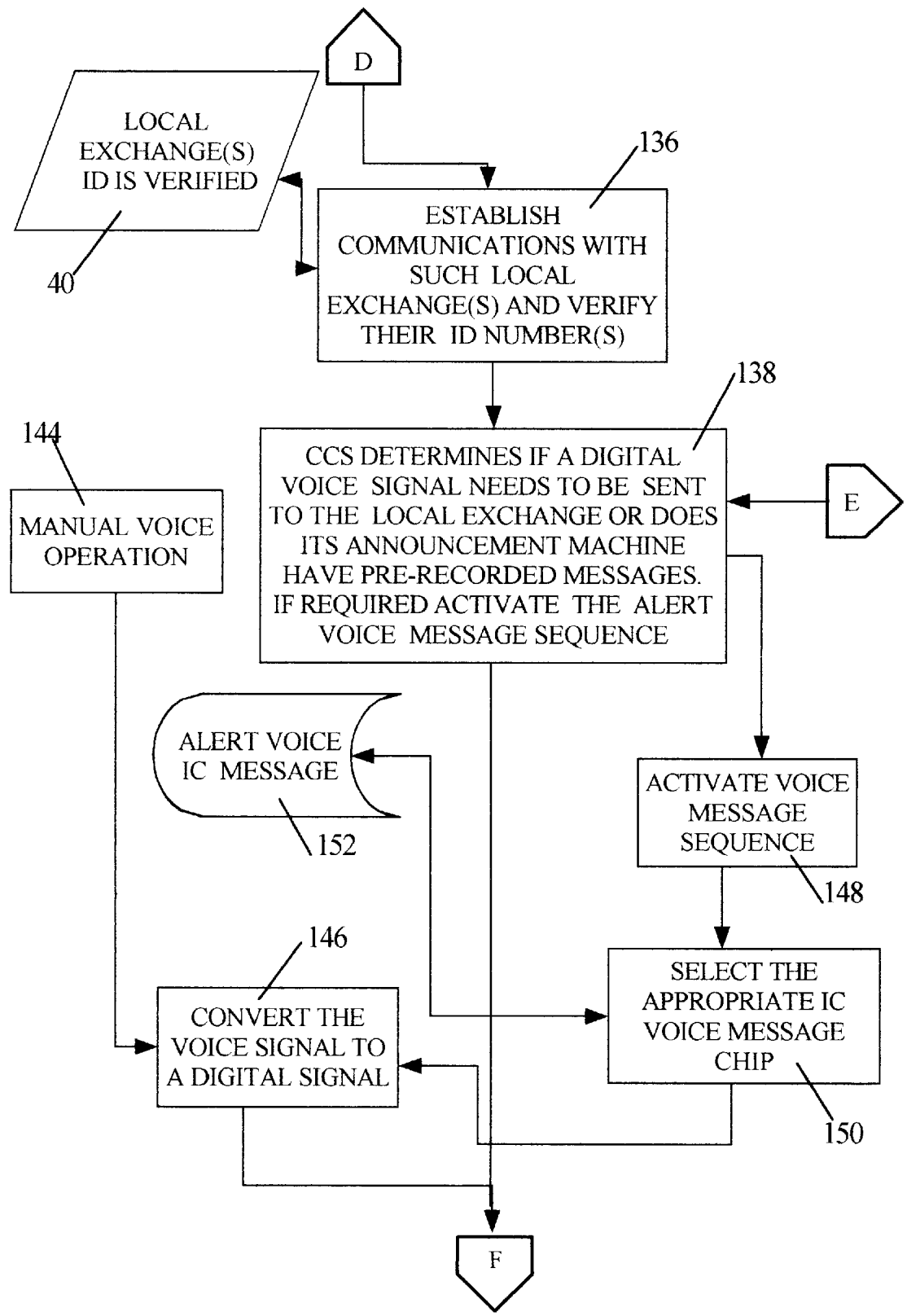
Figure 11:
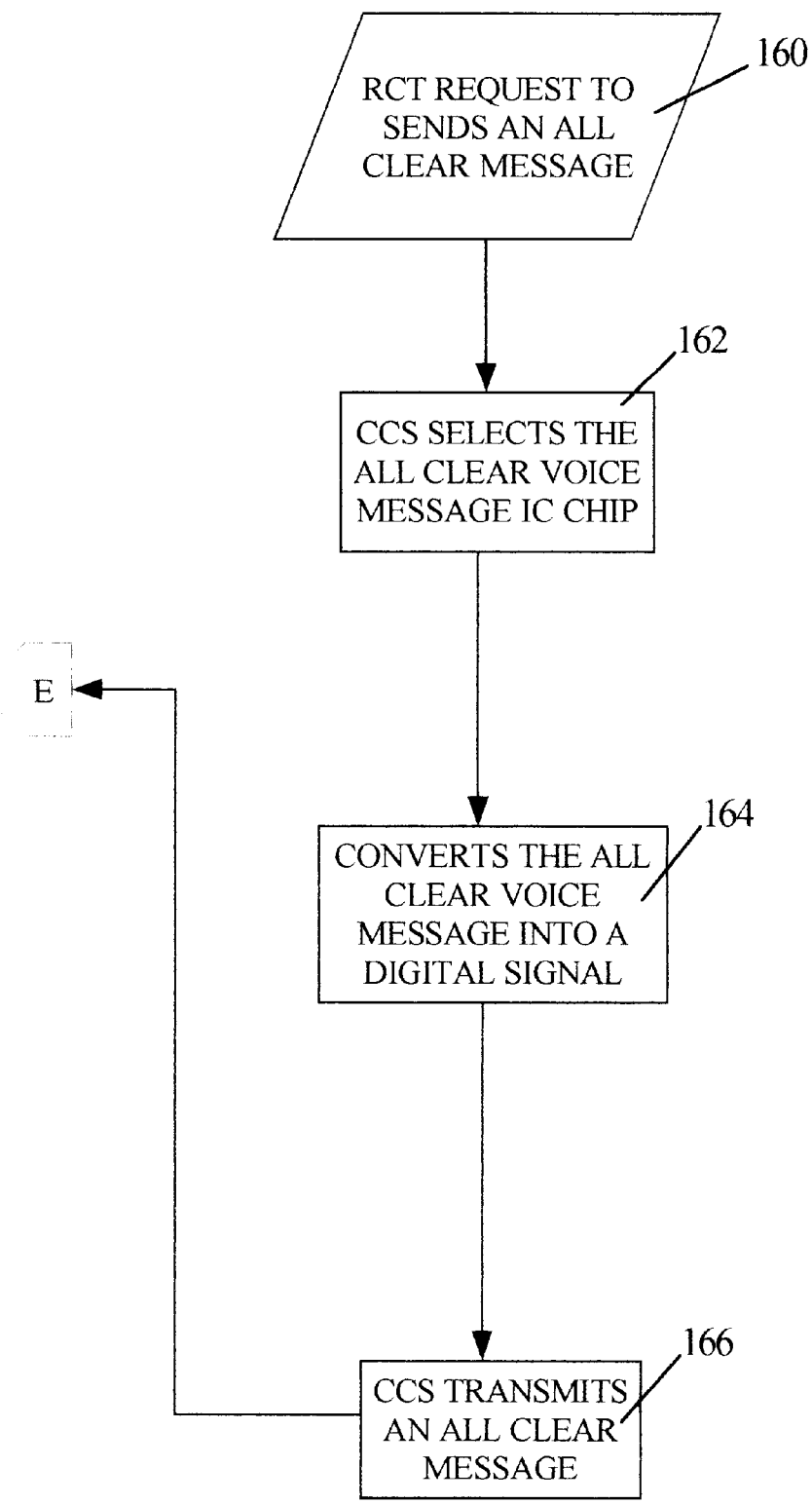
Figure 12:
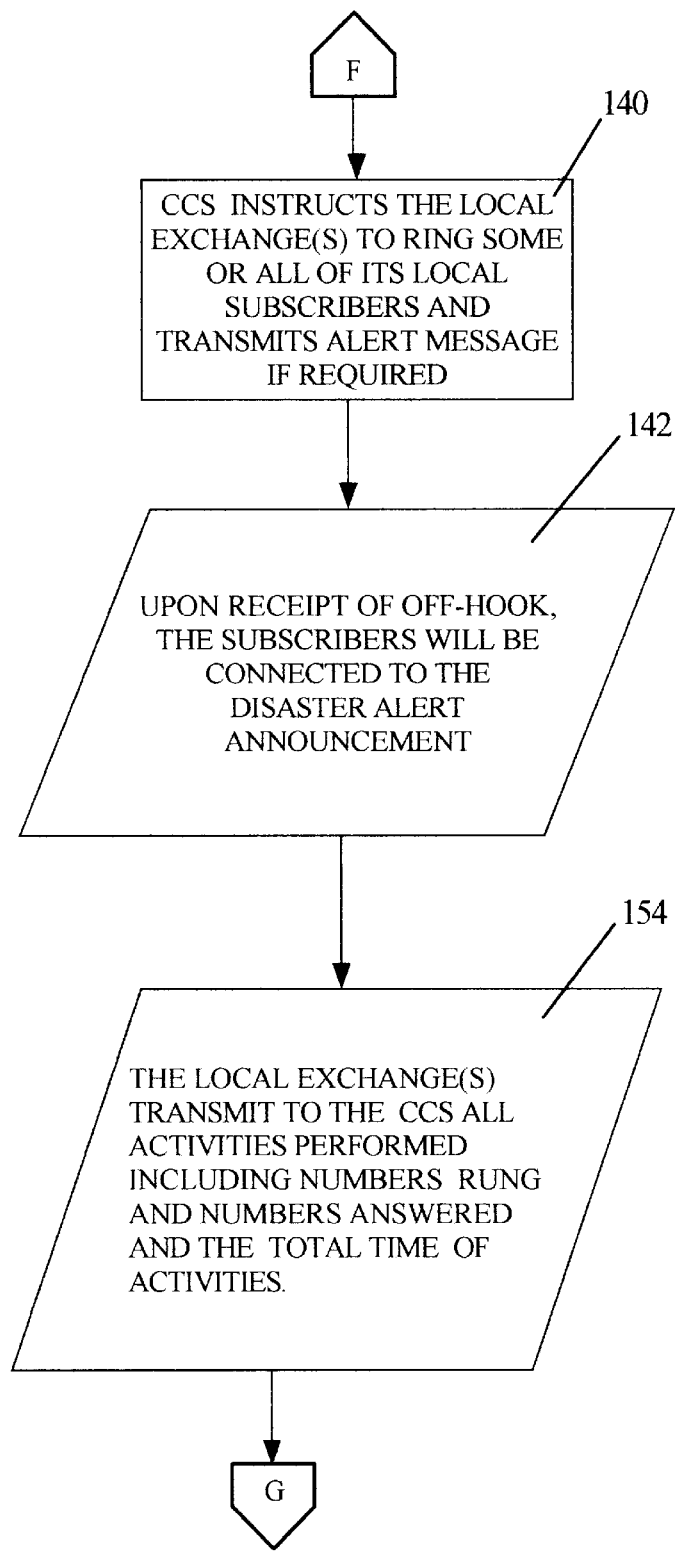
Figure 13:
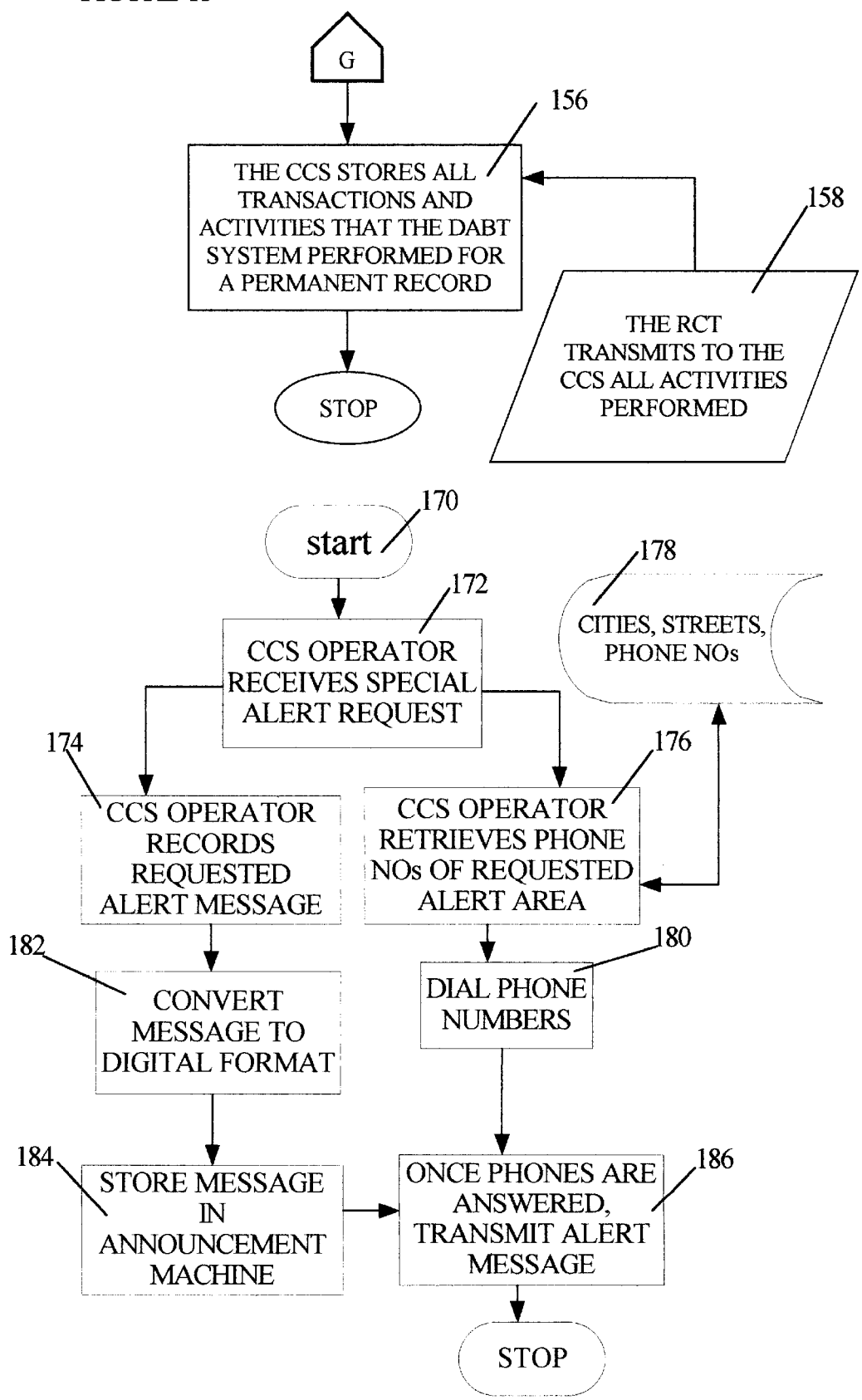

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are used. They are not limited to direct connection but include connection through other elements where such connection is recognized as being equivalent by those skilled in the art.

DETAILED DESCRIPTION OF THE INVENTION

FIG. 1 illustrates the three principal components of an apparatus embodying the present invention. These components are a central computer system 10, which is connected through one of several conventional communication networks or links 12 to at least one and preferably a plurality of remote computer terminals 14A–14Z. Each remote computer terminal, 14A–14Z, is located at a threat detection location. Such locations include the National Weather Service, the Federal Emergency Management Agency, and other locations, such as those referred to above, which have responsibilities providing them with early receipt of information regarding threatened disasters. The central computer 10 is also connectable in communication through one or more conventional communication networks 12 to at least a plurality of local telephone exchanges 16A–16Z and preferably has the potential for connection to all telephone exchanges in the country. Each telephone exchange 16A–16Z has a telephone switch providing connection to its local subscribers 18A–18Z in its geographical service area.

Referring now to the three major components in more detail, each of the remote computer terminals 14A–14Z is a conventional computer terminal including modems, wireless transceivers or other equipment enabling it to connect through a communication's network to the central computer 10. The purpose of the remote computer terminals 14A–14Z is to permit an operator to input an existing threat data object for communication to the central computer. As illustrated in FIG. 3, each instance of such a data object includes at least attributes of a type of threat, such as a hurricane, and a geographical threat location for that existing threat. An optional third attribute of threat heading may also be included and used for those disasters which move across a geographical region. Although the data representing the threat location may be presented in accordance with any of several different geographical location systems, such as latitude and longitude, it is preferred to define a geographical location using political boundaries, such as states, counties and cities, in a hierarchical arrangement with subdivisions for the geographical service area of each local telephone exchange at the bottom of the hierarchical structure. Each of the remote computer terminals 14A–14Z is conventionally programmed to initiate a communication connection to the central computer 10 and transmit data to and receive data from the central computer 10 including the transmission to the central computer of data representing a threat instance, along with its associated type and location attributes.

The central computer 10 is a computer of the type known in the prior art and includes the principal computer components, such as a central processing unit 20 synchronized by a clock 22 and connected for inputting and outputting data to its random access memory 24, read-only memory 26, various input and output devices 28, including a monitor and keyboard, a communication port 30 for connection to the communication networks 12, and a data storage device 32. The storage device 32, such as a conventional hard disk, includes memory area on the data storage device for storing data instances and associated attributes for a local telephone exchange database 34, a message database 36 and a threat response subscriber database 38. Such a computer, of course, also has space either in random access memory 24 or on the data storage device 32, or both, for storing the threat data illustrated in FIG. 3 and communicated to it from one of the remote computer terminals 14A–14Z.

Because the central computer system needs to be reliably capable of processing multiple threats and multiple communications, including simultaneous communication with multiple remote computer terminals and multiple local exchanges, the preferred computer is a supercomputer with multiple central processing units for a multi-threaded operation and having a large memory. Preferably, the computer includes redundant systems for high reliability housed in a hard shelter, safe from threats in its own geographical area and having its own uninterruptable power supply as a back-up in the case of a power failure in its geographical area.

The local exchange database 34 on the data storage device 32 is illustrated in FIG. 4. Each local exchange instance represents one of a plurality of local telephone exchanges, each exchange being connected to telephone subscribers physically located in the exchange's geographical service area. Each exchange instance has associated stored attributes, including at least one electronic communication address, authentication data and the location of the exchange's geographical service area. The communication address may, for example, be an internet address or conventional telephone number. The authentication data, for example, includes passwords and user identification data, public key-private key encryption software and data or other data for gaining authorization for access to the control system of a local exchange. The geographical service area attribute may, for example, comprise the state, county and county region served by the local exchange.

The message database 36 stored in the data storage device 32 is illustrated in FIG. 5. Each message instance in the message database includes a threat-type attribute and a message attribute, preferably in the form of a digitally recorded message, for transmission to telephone subscribers for warning them of an approaching threat.

The threat response subscriber database 38 stored in the data storage device 32 is illustrated in FIG. 6. One use of this database is to provide data enabling the central computer to communicate to a particular agency having the responsibility for dealing with particular types of threats. For example, for a chemical spill type of threat, the central computer may signal the existence of a chemical spill to a State EPA. Threat response subscribers also include police, SWAT teams, bomb squads or other telephone subscribers who respond to particular threats. Each threat response subscriber instance includes a type of threat for which a particular agency is responsible, a geographical location of that agency's area of responsibility and a telephone number for communicating to that agency.

The central computer may also be provided with a complete subscriber database as well as communication and authentication data all stored on the storage device 32. Such a complete subscriber database permits the central computer to communicate with the threat response subscribers in a communication which is initiated by any one of the threat response subscribers. The complete subscriber database would include, for example, telephone numbers and addresses for every subscriber in the country. A particular agency may then initiate a communication with the central computer and communicate a specific threat which is confined to a relatively small geographical area and communicate the associated geographical region. For a small area with relatively few subscribers, such as a city block or a street, the central computer may itself directly dial the telephone subscribers and deliver to them a specific warning message requested by the agency. This would be particulary suitable for local chemical spills, SWAT incidents or bomb threats.

The data storage device 32 also includes conventional program operating instructions or software for operating the central computer 10. The programming in the central computer 10 includes conventional instructions for connecting the central computer in communication with any one of the local exchanges 16A–16Z. It is further programmed to transmit instructions, in accordance with the local exchange's control software and its protocols and syntax, to instruct the local exchange to connect selected telephone subscribers and to transmit a recorded warning message to those of the selected subscribers whose telephones go off hook.

The local exchange is the telephone network switching system at the location where subscribers are to be contacted and is often referred to as a switch. There are a variety of manufacturers of such switches, including AT&T, Siemens and Northern Telecom. Each such switch controls at least one and typically 3–5 prefixes identified by 3 digit strings having an NNX (Network Numbering Exchange) syntax or NXX syntax, in accordance with the North American Numbering Plan (NANP).

FIG. 2 illustrates a typical local exchange which includes a switching network 50 controlled by a central control system 52 and connected to subscribers through subscriber cables 54 and to other switching networks through trunk cables 56. The switching network's central control system 52 may be connected, through its input/output controller 58, a modem or other conventional interface equipment 60 and the switched telephone network, to other computers for receipt of operating instructions. The central control system 52 has a memory system 62 of a conventional type which includes a program store 64. A memory area 66 is used for storing data representing calls which have been made to subscribers communicating the reported warning announcement to them.

For purposes of the present invention, the system may also include an announcement machine 68 upon which is stored at least one warning message for transmission to subscribers. The warning message stored on the announcement machine 68 may be a message transmitted from the message database 36 of the central computer 10 illustrated in FIG. 1, or it may be one of several messages stored at the local exchange. In the latter event, the connecting instructions communicated from the central computer to the local exchange include an instruction dictating which message in the message database to transmit to subscribers for the impending disaster condition.

The operation of the preferred embodiment is illustrated in the flow chart of FIGS. 7–13. The flow chart is not provided at the low level of computer code or instructions because it will be apparent to those skilled in the art of computer programming how to convert the steps of the higher level flow chart to computer code.

Following the start 100, upon detecting the existence of a threatening condition, either a human operator at one of the remote computer terminals 14A–14Z or automated detection equipment initiates a log-on communication sequence to establish a communication link from the remote computer terminal to the central computer 10. At step 102, the remote computer terminal transmits information that an actual alert is to be communicated and may also immediately transmit the data representing the type of threat. The actual alert information distinguishes this communication from other possible communications, such as a test. At step 104 the Central Computer System (CCS) responds by initiating its alert sequence and at step 106 communicates an inquiry back to the operator of the remote computer terminal inquiring whether the operator wants to view a graphical, geographical display from which the geographical area of the threat can be selected, or whether the remote computer terminal operator will simply transmit the location information. In the unlikely event the remote computer terminal operator can key in the exact location of the threat, then at step 108 that operator transmits that location information to the central computer. However, in the more likely event that the remote computer terminal operator prefers to select the location from graphical displays of maps, the central computer requests general geographical information, such as a particular state, at step 110, which is then transmitted by the remote computer terminal operator at step 112 back to the central computer. Then, at step 114 the central computer retrieves the geographical data from a data base of geographical maps at 116 and transmits those maps at step 118 back to the remote computer terminal where at step 120 they are displayed upon the console of the remote computer terminal. At step 122, the operator at the remote computer terminal selects a location from the display and at step 124 transmits that location data back to the central computer.

Computer software for performing this map and location selection operation may be conventional in nature and of the type currently used on the internet for web sites providing mapping information. Such software provides the options for first presenting a large scale map and then through a series of consecutive, smaller region selections eventually presenting a detailed map from which final geographical selection of the actual threatened area and its local exchanges may be made.

In any event, this sequence of events leads to the transmission at step 124 of the threat location attribute for the existing threat instance which caused the remote computer terminal operator to connect to the central computer and initiate an alert. Preferably, the central computer operator may choose one or more prefixes controlled by the switch of a local exchange. If the threat type attribute was not initially transmitted, it is transmitted with the location attribute and optionally a heading attribute may be transmitted if appropriate and available.

Preferably, the central computer then communicates an acknowledgement of its receipt of the existing threat data from the remote computer terminal at step 126 and then at 128 requests verification by retransmission of the received data from the central computer back to the remote computer terminal, so that the data can be compared and confirmed by conventional error checking techniques and preferably visually displayed to the remote computer terminal operator, who can then transmit at step 130 a verification that the data is correct. Of course, if the operator of the remote computer terminal finds that the data is in error, it will be necessary to loop back to step 106.

Upon receipt of verification of the threat type, threat location and optionally the threat heading, in step 132 the central computer makes a query of its local exchange database 34 obtaining the local exchange data object or objects having the location of the threat and retrieves the attributes associated with each such location which are the communication address and ID/Authorization data for each local exchange selected by the remote computer terminal operator.

Following retrieval of the communication address and ID/Authorization data of each local exchange instance which is stored in its local exchange database 34 and has a geographical location selected by the remote computer terminal operator, the central computer then, at step 136, establishes communications with each such local exchange and verifies in step 40 that it is connected to the selected local exchange. This communication link is established using the communication address attribute, such as a telephone number or internet address and using the appropriate entry code or authorization code for accomplishing authentication to permit access.

The central computer must next determine at step 138 whether it is necessary for the central computer to transmit to the local exchange a voice message to be replayed to local subscribers as a warning, or whether, alternatively, such messages are already recorded and available at the local exchange. This can be done either by an electronic inquiry to and response from the local exchange or by the maintenance and updating at the central computer of a data storage area providing information whether or not each local exchange has pre-recorded messages. In the event that the messages are recorded at the local exchange, the process can go directly to step 140 at which the central computer instructs the local exchange to ring and connect to some or all of its local subscribers and transmit the alert message to those of the subscribers whose telephones go off-hook. At step 142 upon receipt of an off-hook signal, the subscriber would be connected to the disaster alert announcement machine 68.

In the event an alert message is not prerecorded, at either the local exchange or the central computer, the operator of the central computer may initiate a manual voice operation at step 144 allowing the operator to record a voice message and convert that voice message at step 146 to a digital format for transmission to the local exchange as a part of the instructions of step 140. Alternatively, the voice message sequence may be activated at step 148 to permit selection at step 150 of the appropriate voice message prerecorded and stored at 152 at the central computer for transmission. If the prerecorded message was not stored in digital format, then the message would be digitized in step 146 before transmission in step 140. If the prerecorded message was stored in a digital format, then step 146 would not apply and the message would be transmitted in step 140.

The degree of detail and information in the instructions of step 140 given to the local exchange may vary from minimal over a range to quite extensive and detailed instructions. For example, in highly populated areas a massive number of telephone subscribers, both residential and commercial, will need to be provided with the alert message. In some areas this may require connection to hundreds of thousands of subscribers. Since each NNX or NXX can service only 10,000 subscribers, it is clear that often several local exchanges must be contacted and provided with instructions. Furthermore, the central computer can be provided with data representing the number of subscribers served by each local exchange and can calculate the maximum amount of time the local exchange central control system should wait for a subscriber to go off-hook and then go on to connect to another subscriber in order to maintain a sufficient calling rate to complete notification within a sufficiently short time that a meaningful alert or warning is given to most of the effected people. This may be included in the instructions.

The connecting instructions of step 140 may also include an instruction to provide a ringing sequence for the warning message which is different from the conventional ringing sequence. This alerts a telephone subscriber to the fact that the message is unusual and important.

Additionally, the instructions may include an instruction to apply a warning tone to the lines of those subscribers who are off-hook and therefore already engaged in a telephone conversation or data communication.

Additionally, the central computer may interrogate its threat response subscriber database, illustrated in FIG. 6, and its complete subscriber database to retrieve data enabling the central computer to communicate with a particular agency, such as the police, SWAT team, EPA, or bomb squad, having the responsibility for dealing with particular types of threats, such as chemical spills, etc., so that the central computer can dial the telephone subscribers in the alert area.

Preferably, each of the local exchanges at step 154 transmit to the central computer data representing all of the activities it has performed, including the telephone numbers rung, the numbers of the subscribers who have gone off-hook, the time of the activities and any other relevant data for maintaining a record at step 156 of the threat event for purposes of both subsequent evaluation of the effectiveness of the system to assist in its improvement and to maintain historical, archival records. Desirably, at step 158 the remote computer terminals also transmit data for recording as a part of that permanent record.

It is also desirable that at such time as the remote computer terminal operator detects that the threat has ceased, an all-clear message be transmitted at step 160 to the central computer, permitting the central computer at step 162 to select an appropriate all-clear voice message, convert it to a digital signal (if required) at step 164 and transmit it at step 166 to step 138 where the sequence then continues with the all-clear message in the same manner as it proceeded with the alert or warning message.

The operator at the remote computer terminal may also initiate the identical sequence for updated messages as the remote computer terminal operator becomes aware of updated information, for transmission to the telephone subscribers in the same manner as the initial message.

For special cases where it is necessary to contact small groups of telephone subscribers, such as people living on a particular square block or street in a city, to inform them of unusual activities or threats, such as a chemical spill, SWAT team or police activities, bomb threats, etc., the central computer (CCS) shall do so. Beginning at step 170, a particular agency having the responsibility for dealing with such unusual types of threats or activities contacts the central computer operator. In step 172, the central computer operator receives the special alert request from the agency and the required alert message to be sent to those small groups of telephone subscribers that are threatened. In step 174, the central computer operator records the alert message and then in step 182 the central computer converts the alert message into a digital format before storing it in the announcement machine at step 184. In step 176, the central computer operator instructs the central computer to retrieve from the compiled subscriber database 178 the telephone numbers for those telephone subscribers who need to be alerted of the unusual activities or threats. In step 180, the automatic telephone dialer dials all of those telephone numbers retrieved from the database and once the telephones are answered, the special alert message is transmitted at step 186.

Although a variety of conventional communication links for establishing communications between the central computer and the local exchanges have been referred to, there are some preferences and some limitations with respect to those that are available. The preferred communication link is over the internet because this connection may be established more quickly and provides a higher data transmission rate. In this system, the central computer is connected through an internet server over the internet to the input/output controller (IOC) of the local exchange using the local exchange's IP address stored as the communication address attribute in the local exchange database. However, currently this communication link only permits instructions to be transmitted and not data. Consequently, the internet communication link can only be used where the alert warning messages have been previously recorded at the local exchange. If the internet connection cannot be accomplished or fails, or if a recorded message must be transmitted from the central computer to the local exchange, connection may be accomplished over an appropriate long distance carrier. Preferably, in order to secure the safety of redundancy, multiple long distance carriers may be accessed. Further, if neither of these communication links can be established or if they fail, it is desirable that a third back-up through a satellite communication be accessible. Of course, in the unusual event that the threat is local to the central computer, local carriers may be used.

Algorithms assigning priority to particular subscribers may be developed for assigning priority of importance to particular subscribers within an exchange or to certain exchanges. This may, for example, be based upon distance from the center of highest probability of severest damage or injury.

While certain preferred embodiments of the present invention have been disclosed in detail, it is to be understood that various modifications may be adopted without departing from the spirit of the invention or scope of the following claims.

I claim:

1. A method for alerting telephone subscribers in a geographical area of a threat to the area, the method comprising:
    (a) storing in a central computer a plurality of local telephone exchange instances for each of a plurality of local telephone exchanges, each exchange being connected to telephone subscribers physically located in a geographical service area, each stored exchange instance having associated stored attributes including an electronic communication address for the exchange, authentication data for data communication access to the exchange and location of the geographical service area of the exchange;
    (b) communicating to the central computer an electronic digital data signal having threat information representing an existing threat instance having attributes of a type of threat and a geographical location of the existing threat, and storing the threat information in the central computer;
    (c) retrieving the electronic communication address for at least one threatened exchange at the geographical location of the existing threat and connecting the central computer in communication with the threatened exchange;
    (d) communicating computer-readable connecting instructions from the central computer to the threatened local exchange to connect selected telephone subscribers and executing said connecting instructions at the threatened local exchange; and
    (e) transmitting a recorded warning message to those of said selected subscribers whose telephones go off hook.

2. A method in accordance with claim 1 wherein the method further comprises storing a plurality of warning messages on said central computer and communicating a selected warning message to the threatened exchange.

3. A method in accordance with claim 1 wherein the method further comprises storing a plurality of warning messages on a computer controlling said local exchange and communicating to said local exchange an instruction selecting a warning message for transmission to subscribers.

4. A method in accordance with claim 1 further comprising communicating directional heading information to the central computer.

5. A method in accordance with claim 1 and further comprising communicating further updated threat information to the central computer.

6. A method in accordance with claim 1 wherein said threat information representing a type of threat and a geographical location of the threat is manually input to a remote computer terminal which is remote from said central computer and communicated to the central computer.

7. A method in accordance with claim 6 wherein the step of communicating threat information to the central computer more particularly comprises first communicating general geographical threat location information designating a relatively larger geographical area to the central computer, retrieving from the stored instances of local telephone exchanges and communicating back to the remote computer terminal, local exchange location information for local exchanges having service area location attributes near the previously communicated general threat location, displaying the local exchange location information at the remote computer terminal and then communicating selected instances of the communicated local exchanges back to the central computer.

8. A method in accordance with claim 6 further comprising recording a special warning message at the central computer and then communicating the special warning message to a threatened local exchange.

9. A method in accordance with claim 6 wherein the method is performed simultaneously with a plurality of remote computer terminals.

10. A method in accordance with claim 9 wherein the method is performed simultaneously with a plurality of local exchanges.

11. A method in accordance with claim 1 wherein the execution of said connecting instructions includes a ringing sequence different from the conventional ringing sequence.

12. A method in accordance with claim 1 wherein the execution of said connecting instructions further includes applying a warning tone to subscribers who are off hook.

13. A method in accordance with claim 1 and further comprising storing in the central computer a plurality of threat response subscriber instances, each having attributes of a type of threat, a geographical location and a telephone number.

14. A method in accordance with claim 13 and further comprising the central computer dialing selected telephone subscribers for a particular threat.

15. A method in accordance with claim 14 and further comprising transmitting from the central computer a warning message to the dialed telephone subscribers who go off hook.

16. A computer and associated communication link apparatus for connection to a telephone local exchange switching apparatus and alerting people in a geographical area of a threat to their area, the apparatus comprising:
  (a) at least one remote computer terminal at a threat detection location for inputting threat information representing a type of threat and a geographical location of the threat; and
  (b) a central computer connectable by a communication link to a remote computer terminal for receiving the threat information from the remote computer terminal, the central computer having a memory area for storing data instances and associated attributes for each of a plurality of local telephone exchanges, each exchange being connected to telephone subscribers physically located at a geographical service area, each stored exchange instance having associated stored attributes including an electronic communication address, authentication data and location of the exchange's geographical service area, the central computer also having a memory area for storing a threat instance and associated attributes of threat type and the geographical location communicated from the remote computer terminal, the central computer being connectable by a communication link to the local exchanges for communicating computer readable connecting instructions from the central computer to the local exchange to connect selected telephone subscribers and transmit a recorded warning message to those of said selected subscribers whose telephones go off hook.

17. An apparatus in accordance with claim 16 wherein the central computer further includes a memory area for storing a plurality of threat type instances and a message as an associated attribute of each threat type instance for communication to a local exchange.

18. An apparatus in accordance with claim 17 and further comprising a plurality of said remote computer terminals.

19. An apparatus in accordance with claim 16 wherein the remote computer terminal is programmed to initiate a communication link to said central computer and transmit data representing a threat instance and associated type and location attributes to the central computer.

20. An apparatus in accordance with claim 19 wherein the remote computer terminal and the central computer are programmed to transmit to the remote computer terminal, in response to receipt of said location attribute by the central computer, a plurality of local exchange instances and their location attributes and to display said exchange instances and attributes at the remote computer terminal to permit selection of particular exchange instances by an operator at the remote computer terminal and transmit the selected exchange instances back to the central computer.

* * * * *